D. B. FRENCH.
Wheels for Vehicles.
No. 145,291.    Patented Dec. 9, 1873.
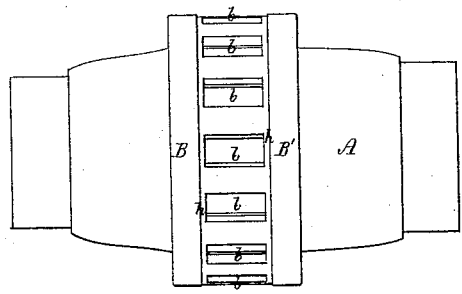
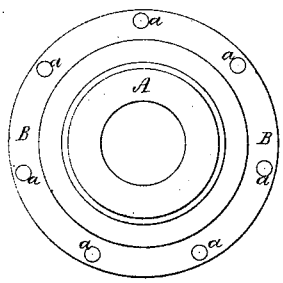
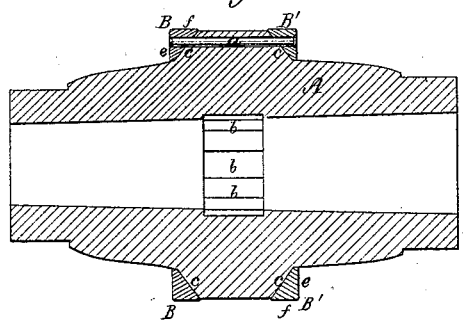
Witnesses.    Dexter B. French
                by his attorney

UNITED STATES PATENT OFFICE.

DEXTER B. FRENCH, OF GRAFTON, VERMONT.

IMPROVEMENT IN WHEELS FOR VEHICLES.

Specification forming part of Letters Patent No. 145,291, dated December 9, 1873; application filed April 11, 1873.

*To all whom it may concern:*

Be it known that I, DEXTER B. FRENCH, of Grafton, of the county of Windham and State of Vermont, have invented a new and useful Improvement in Carriage-Wheel Hubs; and do hereby declare the same to be fully described in the following specification, and represented in the accompanying drawings, of which—

Figure 1 is a side view, and Fig. 2 a longitudinal section, and Fig. 3 an end view, of one of my improved hubs.

My improvement has reference to the construction of each of the clamp-rings and the hub for reception of the same.

In the drawings, A denotes the wooden hub; and B B' the two re-enforces or clamp-rings, these latter being connected and held in place by a series of rivets, $a$ $a$, going through them and the raised part of the hub, or that part which is directly between them, each rivet being between two of the spoke-mortises $b$ $b$, so as not to interfere with the spoke-tenons during driving of the spokes into the mortises. A transverse section of each of such rings is a right-angled triangle, whose hypotenuse only is in contact with the wood of the hub, the part against which such hypotenusal side bears, being correspondingly sloped. In other words, the bearing $c$ for the ring is a true conic frustum, while the interior surface of the ring is also correspondingly conical. The outer surfaces $e f$ of the ring are at right angles; and, consequently, when the two rings are in place on the hub, one of such surfaces of each ring is parallel to the other, and in a plane at right angles with the axis of the hub. It will also be seen that between the mortises and each conical slope $c$, there is a space, $h$, in order that the rings may be at short distances from the mortises, so as not to touch the spokes or interfere with the driving of them.

Such rings, as heretofore made, have had on their inner surfaces a right-angular shoulder, or what was substantially so, to bear against a corresponding shoulder on the hub, such being shown in Robert W. McClelland's patent of May 2, 1871, No. 114,458.

In carrying out my invention I dispense with any such shoulder, making the inner surface of each ring and its bearing strictly conical, whereby I am enabled to obtain a perfect close fit of the ring to the surface of the bearing, especially by means of the rivets. Unless the rings fit closely to the bearings the hub is liable to crack, and moisture and dirt getting between the ring and its bearing are injurious to the ring and bearing. Furthermore, with my improvement, should the hub shrink from the ring, a perfect fit of the ring to the bearing may be effected by simply setting up the rivets.

It is necessary to have the space $h$ between the mortises and the ring or the ring-bearing $c$, otherwise the rings could not be set up to a close fit to their bearings, as the spokes would prevent such. Furthermore, it is very desirable to have the rings sufficiently away from the spokes to not interfere with them while they are being driven into the hub.

When the rings have shoulders on their inner surfaces, such shoulders in case of shrinkage of the hub operate to prevent the rings from being driven to a close fit upon the contiguous surfaces of the hub.

I therefore make no claim to a wooden hub re-enforced by metallic rings extending around it at its spoke-mortises. Neither do I claim a combination of shells having projections with the wood of the hub, all being as shown and claimed in the United States patent No. 141,659, dated August 12, 1873, and granted to Patrick Murphy, for in such case the shells, (which are conical tubes,) by their arrangement with the wood, are obstacles to the free setting up of the projections.

In carrying out my invention I dispense with such shells altogether, and use rings only having conical inner surfaces, as described. By dispensing with the shells I avoid the danger of breakage of such and their projections when the wheel-hub may be struck by another hub or object. I also avoid all liability, while the hub may be in the act of being washed, of water getting into the shell or between it and the wood by capillary attraction or otherwise, and producing mold, rust, and decay.

What I claim as my improvement in such a re-enforced hub is—

The rings B B', right-angled in cross-section, the hub A having wooden bearings $c$, conical on their plane bearing-surfaces, with spaces $h$ $h$ between them, and the spoke-mortises $b$, and the bolts $a$, all combined substantially as set forth.

DEXTER B. FRENCH.

Witnesses:
W. G. WYMAN,
A. H. BURGESS.